(12) United States Patent
Holbrook et al.

(10) Patent No.: US 7,267,331 B2
(45) Date of Patent: Sep. 11, 2007

(54) SYSTEM AND METHOD FOR DETERMINING APPROPRIATE CONDITIONS FOR LEVELING A VEHICLE HAVING AN AIR SUSPENSION SYSTEM

(75) Inventors: Gregory A. Holbrook, Zionsville, IN (US); Graham R. Brookes, Carmel, IN (US); Daniel L. Nordmeyer, Indianapolis, IN (US)

(73) Assignee: BFS Diversified Products, LLC, Indianapolis, IN (US)

( * ) Notice: Subject to any disclaimer, the term of this patent is extended or adjusted under 35 U.S.C. 154(b) by 370 days.

(21) Appl. No.: 10/601,448

(22) Filed: Jun. 23, 2003

(65) Prior Publication Data

US 2004/0260442 A1 Dec. 23, 2004

(51) Int. Cl.
*F16F 9/43* (2006.01)
(52) U.S. Cl. .............. 267/64.28; 701/37; 188/322.12
(58) Field of Classification Search ............ 701/37, 701/38; 280/6.159, 6.157, 6.158, 5.503, 280/5.507, 5.514, 5.505, 6.155, 124.157–124.161, 280/6.16; 267/64.11–64.28; 188/266.1–266.6; 180/41
See application file for complete search history.

(56) References Cited

U.S. PATENT DOCUMENTS

| | | | |
|---|---|---|---|
| 4,948,166 A * | 8/1990 | Kaneko | 280/5.501 |
| 5,159,554 A | 10/1992 | Buma et al. | |
| 5,346,242 A * | 9/1994 | Karnopp | 280/5.514 |
| 5,387,005 A * | 2/1995 | Hayase et al. | 280/5.515 |
| 5,430,647 A * | 7/1995 | Raad et al. | 701/38 |
| 5,570,287 A * | 10/1996 | Campbell et al. | 701/37 |
| 6,298,292 B1 * | 10/2001 | Shono et al. | 701/37 |

FOREIGN PATENT DOCUMENTS

| | | | |
|---|---|---|---|
| FR | 2 630 684 A1 | | 11/1989 |
| JP | 363212110 | * | 9/1988 |
| JP | 8-138842 | * | 5/1996 |
| WO | WO 2005/000607 A1 | * | 1/2005 |

* cited by examiner

*Primary Examiner*—Devon Kramer
(74) *Attorney, Agent, or Firm*—Timothy Nauman; Michael R. Huber

(57) ABSTRACT

A method of determining appropriate conditions for leveling a vehicle having a height adjustable air suspension system. The method includes the steps of providing an acceleration-determining device adapted to output a signal associated with an acceleration of the vehicle. Another step includes measuring an acceleration value of the vehicle and comparing the acceleration value to a pre-determined signal. Yet another step includes determining whether appropriate conditions exist for leveling the vehicle based on the comparison. A system for performing the steps of the method is also included.

21 Claims, 3 Drawing Sheets

SYSTEM AND METHOD FOR DETERMINING APPROPRIATE CONDITIONS FOR LEVELING A VEHICLE HAVING AN AIR SUSPENSION SYSTEM

The present invention relates broadly to the art of vehicle suspension systems and, more particularly, to a system and method for determining when, during the dynamic operation of a vehicle having a height adjustable air suspension system, conditions are appropriate for leveling the vehicle.

BACKGROUND OF THE INVENTION

Vehicles having height adjustable air suspension systems are well known and commonly used. Generally, such systems include a plurality of air springs compressibly supported between the sprung and unsprung masses of the vehicle. The air springs are commonly positioned adjacent each wheel of the vehicle. On a passenger vehicle, for example, each wheel is supported on the frame or unsprung mass of the vehicle by a pivot arm, and an air spring and damper arrangement is typically supported between each pivot arm and the body or sprung mass of the vehicle. The height of the passenger vehicle can then be adjusted on a wheel-by-wheel basis by delivering or exhausting a quantity of air into or out of each air spring to respectively increase or decrease the height of the same, which in turn adjusts the height of the vehicle. As such, the operator can adjust certain performance characteristics of the vehicle as desired. For example, the amount of ground clearance can be increased where rough terrain is encountered, or the center of gravity can be lowered to improve handling during high speed driving. To help ensure that each air spring is at the desired height, such suspension systems often include a height sensor adjacent each air spring and damper arrangement.

Given the prevalence of these height adjustable suspensions systems, additional features have been added to these types of suspension systems in recent years to permit the same to provide dynamic leveling of the vehicle while the same is in operation. Such systems are used to compensate for body roll and other movements. However, one disadvantage of such systems is that adjusting the level of the vehicle while the same is being accelerated or decelerated, such as when the vehicle is traveling through a turn, when the vehicle is undergoing a braking action and/or when the vehicle is increasing speed, for example, can result in the vehicle having unusual or uneven height conditions that can unfavorably affect handling. As such, these systems tend to be sophisticated to avoid and/or compensate for such conditions.

One example of such a system is disclosed in Raad, et al. (U.S. Pat. No. 5,430,647). Raad discloses a system and apparatus for maintaining vehicle ride height by using height sensors at each wheel to measure the relative height of the body at each wheel. The system then identifies differences in ride height from side to side and from front to back, and acts to adjust the vehicle ride height to compensate for the body movements. As mentioned above, one disadvantage of such systems is that the same are complex and often require sophisticated sensing and computational systems to attempt continually to measure and compensate for dynamic body movements of the vehicle.

Another disadvantage of systems such as that disclosed in Raad, for example, is that the continual adjustments of the suspension system to compensate for the dynamic movements of the body of the vehicle tend to consume a considerable amount of compressed air. As such, the power consumption of the compressor supplying the compressed air can be significant. Techniques have been used in attempts to reduce the compressed air consumption and attendant power load. One such technique includes monitoring the braking system and not leveling the suspension system while the braking system is in operation. This technique, however, also has disadvantages. One such disadvantage is that the braking system typically operates for only a fraction of the time that the vehicle is in operation. As such, this technique often provides only minimal reduction in compressed air consumption and power usage.

Another disadvantage of such systems is that there are other conditions during the dynamic operation of the vehicle in which it is desirable to avoid leveling or otherwise adjusting the suspension system of the vehicle. These conditions can include when a vehicle is accelerating, such as laterally, longitudinally or in a resultant direction, for example. To date, however, known systems have not determined whether or not conditions are appropriate for leveling a vehicle based, at least in part, on an acceleration level of the vehicle.

SUMMARY OF THE INVENTION

A method of determining of an appropriate condition for leveling a vehicle having a height adjustable air suspension system includes a step of determining an acceleration value of the vehicle. Still another step includes comparing the acceleration value to a pre-determined threshold value. Yet another step includes determining whether an appropriate condition exists for leveling the vehicle based on the comparison.

Another method of determining appropriate conditions for leveling a vehicle having a height adjustable suspension system is provided and includes providing an acceleration-determining device suitable for determining an acceleration of the vehicle and adapted to output a signal corresponding to the acceleration. Another step includes providing a comparator in electrical communication with the acceleration-determining device and adapted to compare the signal therefrom to a predetermined threshold. Still another step includes determining an acceleration of the vehicle utilizing the acceleration-determining device and communicating a corresponding signal to the comparator. Yet another step includes comparing the signal to the pre-determined threshold using the comparator. A further step includes determining whether an appropriate condition exists for leveling the vehicle based on the comparison.

A system for determining an appropriate condition for leveling a vehicle having a height adjustable air suspension system is provided and includes an acceleration-determining device and a comparator. The acceleration-determining device is adapted to determine an acceleration of the vehicle and output a signal corresponding to the acceleration. The comparator is in electrical communication with the acceleration-determining device and is adapted to receive and compare the signal from the device with a pre-determined threshold. The comparator is also adapted to output a signal indicative of the condition for leveling the vehicle.

DETAILED DESCRIPTION OF THE INVENTION

The present invention is hereinafter discussed in detail with regard to a vehicle undergoing an acceleration. Specific reference is made to determining the magnitude of such an acceleration and evaluating whether conditions are appropriate for leveling the vehicle based, at least in part, on the magnitude of such an acceleration. For the purposes of clarity and ease of reading, terms herein such as acceleration, acceleration value, threshold and others are used in absolute value terms, without regard to positive or negative value. For example, no distinction is made herein between an acceleration of 0.25 g and an acceleration of −0.25 g, which is also referred to as a deceleration. It will be appreciated that in other embodiments and/or steps of the present invention, such a distinction could be made and additional and/or separate actions could be undertaken based on such conditions.

Figure 1:
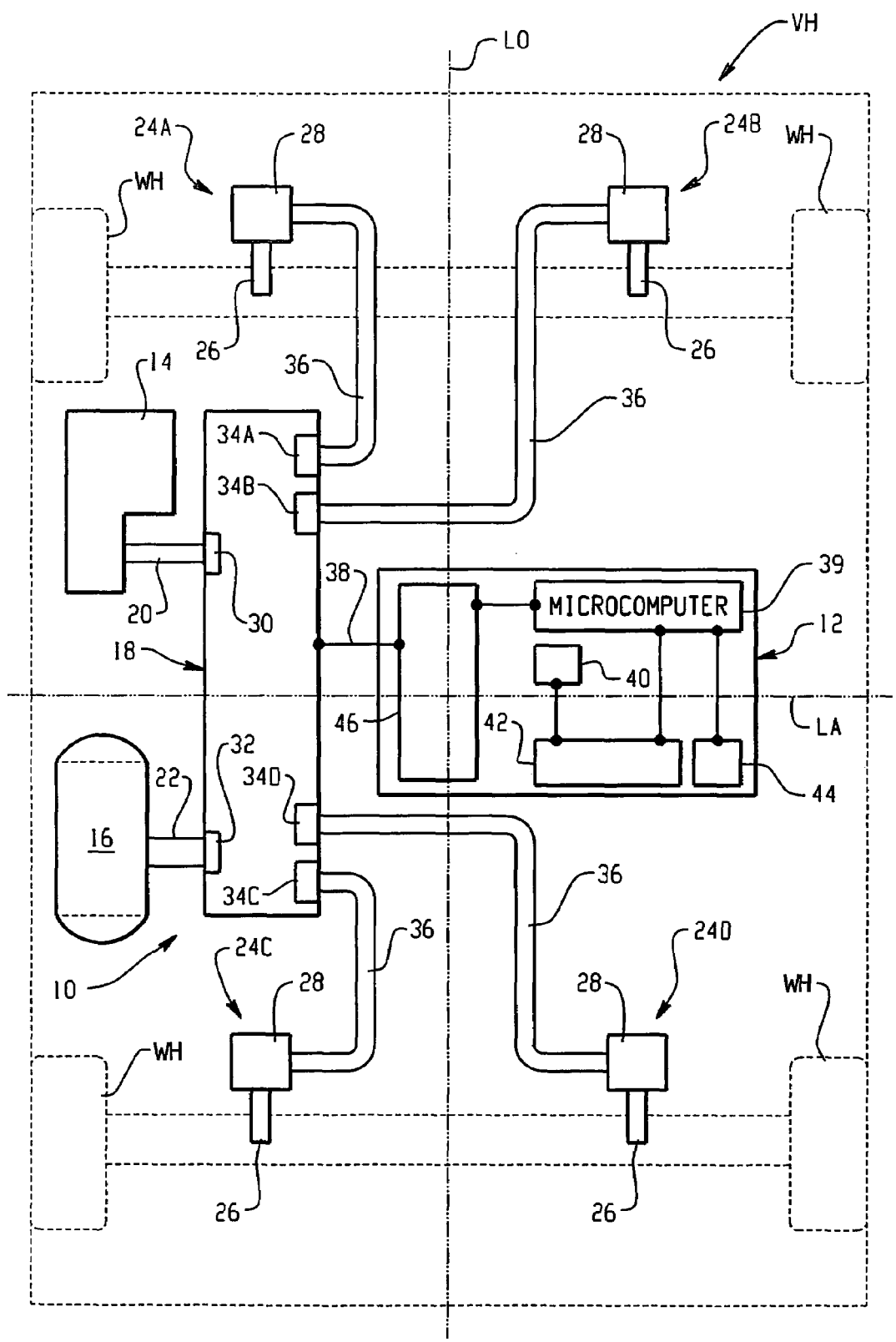
FIG. 1 schematically illustrates one embodiment of a system in accordance with the present invention shown installed on a vehicle having a height adjustable air suspension system.

Turning now to the drawings, wherein the showings are for the purposes of illustrating preferred embodiments of the invention only and not for the purposes of limiting the invention, FIG. 1 illustrates a vehicle VH having a height adjustable air suspension system 10 supported on the vehicle and an electronic control unit (ECU) 12 supported on the vehicle and interconnected with suspension system 10. ECU 12 is one example of a system suitable for determining appropriate conditions to level the vehicle. Vehicle VH is shown in FIG. 1 as being a four-wheel passenger vehicle, such as a sedan or coupe, for example. It will be appreciated, however, that the present invention is equally applicable for use on vehicles of various other types, sizes, styles and/or configurations, such as trucks, trailers, sports cars, and limousines, for example. Additionally, it will be appreciated that suspension system 10, which will be more fully discussed hereinafter, is merely one example of a suspension system suitable for use in association with a method and system according to the present invention.

Air suspension system 10 includes a compressor 14 and a supply tank 16 that are each in fluid communication with a valve arrangement 18 through air lines 20 and 22, respectively. Suspension system 10 also includes a plurality of struts 24A, 24B, 24C and 24D, each associated with a different one of wheels WH of vehicle VH. Each of the struts includes a damper 26 and a height adjustable air spring 28. It will be appreciated that such struts are well known and commonly used. As such, further detail thereof is not provided. Valve arrangement 18 includes valves 30 and 32 that are respectively in fluid communication with compressor 14 and supply tank 16 through the associated air lines. Valve arrangement 18 also includes a plurality of valves 34A, 34B, 34C and 34D that are respectively in fluid communication with the air spring of struts 24A, 24B, 24C and 24D through a plurality of delivery lines 36 extending therebetween. Valve arrangement 18 operates to selectively deliver and exhaust compressed air into and out of each of the air springs, preferably independently, as is well known in the art. Valve arrangement 18 can also include one or more actuators (not shown) suitable for opening and closing the valves as is well known in the art. ECU 12 is preferably in electrical communication with valve arrangement 18 through connector 38, and can be used to directly control the valve arrangement. Alternately, the valve arrangement can have a separate controller that merely receives signals from ECU 12.

One system suitable for determining appropriate conditions to level a vehicle in accordance with the present invention is at least partially embodied in ECU 12 shown in FIG. 1, and can include a microcomputer 39 or any other suitable device or system, such as a microprocessor, for example, for processing or otherwise performing steps of a method in accordance with the present invention. ECU 12 also includes an acceleration-determining device 40, a comparator 42, a timer 44 and a controller 46. Acceleration-determining device 40 can take the form of any apparatus, system and/or numerical calculation suitable for measuring or otherwise determining whether the associated vehicle is undergoing an acceleration and the relative magnitude of any such acceleration. Examples of suitable apparatuses include but are not in any way limited to accelerometers, gyroscopes and/or dual-rate sensors. In one embodiment, acceleration-determining device 40 is a dual axis thermal accelerometer available from Memsic Inc. of North Andover, Mass. Certain apparatuses, such as accelerometers and gyroscopes, for example, may be sensitive to the relative mounting position or orientation thereof on the vehicle. In such cases, one preferred mounting arrangement includes the apparatus being mounted substantially centrally along the laterally and longitudinally extending axes of the vehicle, respectively shown as axes LA and LO in FIG. 1, and preferably in a substantially level orientation. However, it will be appreciated that the apparatus can generally be mounted in a variety of positions and/or orientations and thereafter calibrated to function as desired.

Another suitable acceleration-determining device 40 can alternately be formed from a computer, processor or other suitable calculating device that receives one or more signals indicative of the magnitude of one or more operating conditions of the vehicle in its present state. For example, given the known mass of the vehicle and receiving data signals regarding the speed of the vehicle and the turning radius of the vehicle, such as from the position of the steering wheel, for example, a suitable device can calculate the magnitude of an acceleration of the vehicle. Such as an acceleration normal to the direction of travel, for example. It will be appreciated that sensors and/or other devices suitable for communicating data, such as turning radius, speed and other parameters, are well known to those of skill in the art and are commonly provided on vehicles.

Comparator 42 can include and/or take the form of any suitable device, circuit, system and/or numerical calculation suitable for comparing two or more signals, values and or other output from one or more other devices. Such comparators can include software and/or hardware and can optionally include data storage or memory features for storing one or more threshold values, as will be discussed in detail hereinafter. One example of a suitable comparator is integrated and/or otherwise provided on the same chip as an analog-to-digital converter, as are well known to those of skill in the art. Such an analog-to-digital converter can be provided as an individual circuit or chip, or alternatively can be included as an integrated component of a microprocessor or microcomputer. Additionally, timer 44 can be a device suitable for outputting a signal at a repetitive and known time interval, such as an oscillating quartz crystal, for example. In such case, another suitable device, circuit, system and/or numerical calculation can be used to receive the signals and count the repetitions thereof to make measurements of specific times and perform specific timing functions. For example, microcomputer 39 and software attendant thereto could be used to perform the specific timing functions, such as starting and stopping a specific time duration and determine whether more specific threshold timing conditions have been met, as will be discussed in detail hereinafter, for example. Alternately, the timer can include provisions for outputting a repetitive and known time interval and performing more specific timing functions all on the same device or integrated circuit.

Each of device 40, comparator 42, timer 44 and controller 46 are interconnected with one another and/or with microcomputer 39 to transmit, receive and/or otherwise communicate signals and data therebetween. One suitable arrangement for interconnecting these components is shown in FIG. 1. In this arrangement, acceleration determining device 40 is in electrical communication with comparator 42. The comparator is in electrical communication with microcomputer 39, and can also be included as an integral part thereof, as discussed above. Additionally, timer 44 is in electrical communication with the microcomputer. The microcomputer is in electrical communication with controller 46, and is adapted to communicate signals, data, and/or any other output to the controller. Such interconnection of components can be accomplished by any suitable manner well known to those of skill in the art. The function and operation of the electronic control unit and components thereof will be discussed in further detail hereinafter and will be more clearly illustrated by the discussion hereinafter of embodiments of methods of determining appropriate conditions for leveling a vehicle.

Figure 2:
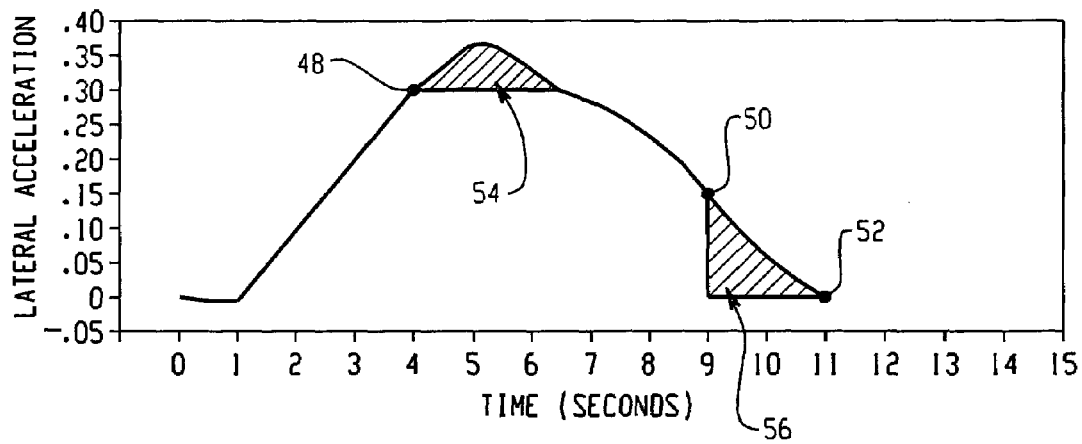
FIG. 2 is a graph illustrating one example of lateral acceleration of a vehicle versus time.

FIG. 2 is a graph showing a curve of lateral acceleration versus time. The curve is merely one example of a typical curve of an acceleration undergone by a vehicle, and is used herein purely for illustration purposes. It is to be specifically understood that the present invention is not intended to be limited by or to the acceleration values indicated in FIG. 2. The graph includes a first point 48 that is indicated on the curve at about 0.3 g and at a time of about 4 seconds. A second point 50 is indicated at about 0.15 g and at a time of about 9 seconds. A third point 52 is indicated on the curve at about 0 g and at a time of about 11 seconds. Lateral acceleration, such as that indicated by the curve in FIG. 2, for example, might occur on a vehicle traveling along a bend in a road.

It will be appreciated that points 48, 50 and 52 merely represent examples of suitable threshold points for determining appropriate conditions for leveling a vehicle in accordance with the present invention, and that any other variations and/or combinations of threshold values can be used without departing from the principles of the present invention. It will be further appreciated that the present example, including these threshold points, will be carried forward through the remainder of this text for the purposes of discussion. However, it is to be clearly understood that this example and these threshold points are not intended to be construed as a limitation of the present invention.

In the present example, it has been pre-determined that no leveling action should be undertaken and any ongoing leveling action should be discontinued on a vehicle that reaches an acceleration of greater than about 0.3 g. Continuing with the present example, a vehicle enters a bend on a road at a time of 0 seconds in FIG. 2. As indicated at first point 48, the vehicle reaches about 0.3 g of lateral acceleration at a time of about 4 seconds after entering the bend of the road. The vehicle incurs lateral acceleration greater than about 0.3 g from a time of about 4 seconds to about 7 seconds, as indicated by area 54 under the curve. In keeping with this example, no leveling action should be initiated during this time and any ongoing leveling action should be terminated.

It has also been pre-determined, for the purposes of this example, that no leveling action should be undertaken until the acceleration of a vehicle is less about 0.15 g for a period of about 2 seconds. Second point 50 indicates the point on the curve at which the acceleration on the vehicle reaches to about 0.15 g. This occurs at a time of about 9 seconds since the vehicle entered the bend in the road. As indicated by the curve in FIG. 2, the acceleration on the vehicle remains below 0.15 g for a period of about 2 seconds until a time of about 11 seconds, which is indicated by area 56 under the curve. Thus, the acceleration of the vehicle meets the condition for leveling indicated as the vehicle having acceleration values less than 0.15 g for a period of time of about 2 seconds. In keeping with the present example, appropriate conditions for leveling the vehicle are determined to exist at a time of about 11 seconds. Said differently, leveling action should not be undertaken until after the condition indicated by point 52 relative to point 50 has been reached.

Figure 3:
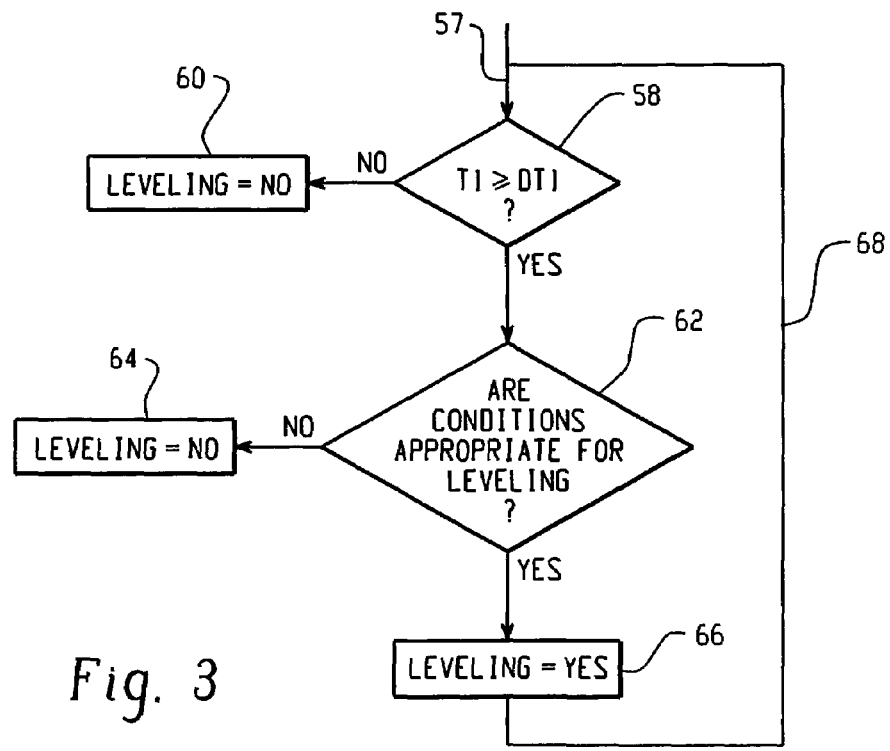
FIGS. 3 and 4 are flow charts illustrating steps of one suitable method of determining appropriate conditions to level a vehicle in accordance with the present invention.
Figure 4:
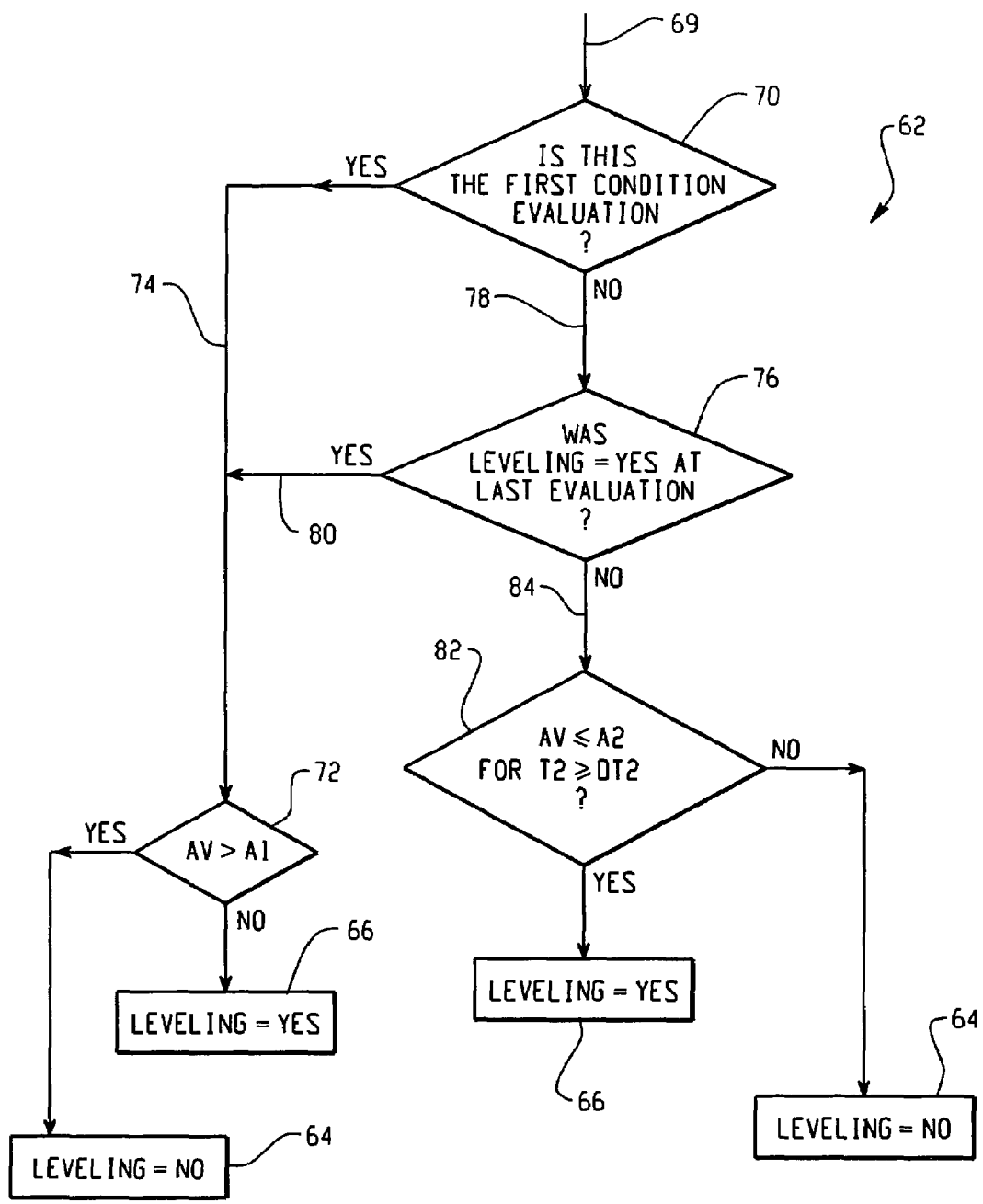

FIGS. 3 and 4 illustrate various steps that can be used in performing a method of determining an appropriate condition to level a vehicle in accordance with the present invention. As shown in FIG. 3, item 58 indicates an initial step that can optionally be included in a method according to the present invention in which a leveling action is initiated only at a time T1 that is greater than or equal to a first, pre-determined threshold time interval DT1. Time T1 can be measured by any suitable device, circuit, system and/or numerical calculation, such as by microcomputer 39 and/or timer 44, for example. Time interval DT1 can be stored in any suitable manner, such as by a digital value in a memory chip or circuit operatively associated with timer 44, for example. Time T1 can begin at any suitable time, such as when the vehicle is started, for example, and is preferably repeatedly measured. That is, once time T1 meets or exceeds threshold DT1, the time T1 can be reset to a zero value, for example, and the measurement and determination repeated. One suitable duration for threshold DT1 is about 40 seconds, for example. If time T1 is less than time interval DT1, then a leveling action is not appropriate as indicated by item 60. However, if time T1 is greater than or equal to time interval DT1, then a leveling action could be appropriate depending upon whether or not other conditions and parameters are met, as indicated by item 62. The comparison of time T1 to threshold time interval DT1 can be made by timer 44 or by comparator 42, for example. Furthermore, the initial input into item 58, indicated by arrow 57, can be provided by any suitable system, sub-system, circuit, or other device, including timer 44, for example.

In addition to evaluating the acceleration of a vehicle, any other suitable conditions or parameters can be used, either separately or in combination, to determine whether or not conditions are appropriate for leveling the vehicle, as shown in item 62. Where one or more of such conditions or parameters are not met, a leveling action is not appropriate, as shown by item 64. However, where such conditions or parameters are met, a leveling action is appropriate and can be initiated, as indicated by item 66. If a leveling action is thereafter initiated, the foregoing evaluation can be repeated, as indicated by arrow 68.

Turning now to FIG. 4, one example of a plurality of conditions and parameters are shown that are suitable for determining whether or not conditions are appropriate for leveling a vehicle in accordance with the present invention.

Such conditions are indicated collectively as item 62 in FIGS. 3 and 4. Item 70 in FIG. 4 includes an inquiry into whether or not this is the first or initial evaluation of the conditions. The initial input into item 70, indicated by arrow 69, can be provided by any suitable device, system, circuit and/or numeric calculation. For example, a value regarding the initial inquiry could be stored on or by microcomputer 39. If this inquiry is the initial evaluation of conditions, such as if the vehicle has just been started, for example, then the evaluation proceeds to item 72 as indicated by arrow 74. If this inquiry is not the initial evaluation of conditions, then the evaluation proceeds to item 76 as indicated by arrow 78. Item 72 is an inquiry as to whether any acceleration AV on the vehicle is greater than a first, pre-determined acceleration limit A1. If an acceleration AV is greater than acceleration limit A1, then conditions are not appropriate for leveling as indicated by item 64. Where no acceleration AV is greater than acceleration limit A1, then conditions are appropriate for leveling, as indicated by item 66. Acceleration AV is preferably determined by acceleration-determining device 40 and a signal corresponding to acceleration AV is preferably communicated to comparator 42. Acceleration limit A1 can be stored in a suitable manner, as discussed above, by the comparator, microcomputer 39 or any other suitable device. In turn, comparator 42 will preferably make the determination as to whether or not the condition in item 72 is met. It will be appreciated that a comparator, such as comparator 42, for example, can be used to make determinations as to whether or not other conditions are met, such as those set forth in items 58, 70 and 76, for example.

Returning to item 76, an inquiry is made as to whether or not conditions were appropriate for leveling during a prior evaluation. Where conditions were appropriate for leveling, then the evaluation proceeds to item 72 as indicated by arrow 80, and an inquiry is made as described above. If conditions were not appropriate for leveling during a prior inquiry, then the evaluation proceeds to item 82 as indicated by arrow 84. At item 82, an inquiry is made as to whether or not acceleration AV of the vehicle has been less than or equal to a second, pre-defined acceleration limit A2 for a period of time T2 that is greater than or equal to a second, pre-defined time interval DT2. If acceleration AV does not meet the conditions of item 82, then conditions are not appropriate for leveling, as indicated by item 64. However, where acceleration AV does meet the conditions of item 82, then conditions are appropriate for leveling the vehicle, as indicated by item 66. Time T2, time interval DT2 and acceleration limit A2 can be measured, stored and communicated in any suitable manner, such as is discussed above. Continuing with the present example, device 40 determines the acceleration AV of the vehicle and communicates the corresponding signal to comparator 42. Once acceleration AV has reached pre-defined acceleration limit A2, comparator 42 thereafter signals microcomputer 39 and/or timer 44 to begin measuring time T2. Acceleration AV and time T2 are communicated to microcomputer 39 and/or comparator 42 and a determination that conditions suitable for leveling a vehicle is made and output when the conditions in item 82 have been met.

Item 64 indicating that conditions are not appropriate for leveling, and item 66 indicating that items are appropriate for leveling can be output to controller 46 in any suitable manner, such as an analog or digital signal electrically communicated to the controller, for example. The controller can then initiate a leveling action, delay the initiation of a leveling action or terminate an ongoing leveling action by directly actuating or de-actuating valve arrangement 18, depending upon the output received. In one example of such an embodiment, the controller could include one or more digital-to-analog converters adapted to convert digital signals from microcomputer 39 and selectively output corresponding analog signals to the actuators of the valve arrangement. Alternately, controller 46 can merely selectively output one or more corresponding signals, such as digital signals, for example, to the valve arrangement. In such case, the digital signals might only indicate that conditions are appropriate or not appropriate for leveling. As such, the valve arrangement could include a suitable device, circuit and/or system to selectively trigger the actuation and/or de-actuation of the valves thereon.

In the foregoing discussion numerous threshold conditions have been discussed. It will be appreciated that such threshold conditions can have any suitable value or range of values. What's more, such threshold conditions can optionally be variable depending upon the performance characteristics of the vehicle, where such characteristics are themselves selectively variable. For example, certain vehicles are equipped with suspension systems that include struts having variable damping rates. In such case, the threshold conditions could be varied to correspond to variations in the damping rate of the struts.

Additionally, acceleration values are discussed herein in terms of percentages of the acceleration due to gravity (g), which is generally acknowledged to be 32.2 ft/sec$^2$ and/or 9.81 m/sec$^2$. As such, an acceleration value of about 0.3 g represents a value of about 30 percent of the acceleration due to gravity. Turning more specifically to the various thresholds and limits recited above, one example of a suitable range of values for acceleration limit A1 is from about 0.1 g to about 0.75 g, and an example of a suitable range for acceleration limit A2 is from about 0.01 g to about 0.5 g. Preferably, acceleration limit A2 is less than or equal to acceleration limit A1. Additionally, one example of a suitable range of values for time interval DT1 is from about 0.5 seconds to about 120 seconds, and an example of a suitable range for DT2 is from about 0.01 seconds to about 10 seconds. However, it will be appreciated that any suitable value or range of values can be used.

While considerable emphasis has been placed on the preferred embodiments of the invention illustrated and described here, it will be appreciated that other embodiments can be made and that many modifications can be made in the embodiments shown and described without departing from the principles of the present invention. Obviously, such modifications and alterations will occur to others upon reading and understanding the preceding detailed description, and it is intended that the subject invention be construed as including all such modifications and alterations insofar as the same come within the scope of the appended claims and/or the equivalents thereof. Accordingly, it is to be distinctly understood that the foregoing descriptive matter is to be interpreted merely as illustrative of the invention and not as a limitation.

The invention claimed is:

1. A method of performing a leveling action on a vehicle having a height adjustable air suspension system and undergoing a vehicle acceleration, said method comprising steps of:
   a) initiating a leveling action adjusting said suspension system toward a pre-determined height condition of the vehicle;
   b) discontinuing said leveling action upon the vehicle acceleration exceeding a first pre-determined acceleration threshold prior to said suspension system achieving said pre-determined height condition;
   c) waiting until the vehicle acceleration decreases below a second pre-determined acceleration threshold that is less than said first pre-determined threshold for a pre-determined period of time; and, d) continuing said leveling action adjusting said suspension system toward said pre-determined height condition.

2. A method according to claim 1, wherein said suspension system includes a controller and said method includes said controller acting to at least partially execute step a).

3. A method according to claim 2, wherein said method includes said controller acting to at least partially execute at least one of steps b) and d).

4. A method according to claim 1, wherein said method includes steps of determining the vehicle acceleration, comparing the vehicle acceleration with said first pre-determined acceleration threshold, and determining that the vehicle acceleration is greater than said first pre-determined acceleration threshold prior to step b).

5. A method according to claim 4, wherein said air suspension system includes an accelerometer and a controller, and said method includes steps of said accelerometer measuring the vehicle acceleration and communicating a signal to said controller.

6. A method according to claim 1, wherein said first pre-determined threshold is an acceleration value of from about 0.2 g to about 0.4 g.

7. A method according to claim 1, wherein said second pre-determined threshold is an acceleration value of from about 0.05 g to about 0.25 g.

8. A method according to claim 1, wherein said pre-determined period of time is one of greater than and substantially equal to about one second.

9. A method of executing a leveling action on a vehicle having a height adjustable air suspension system, said method comprising steps of:

a) initiating a leveling action adjusting said suspension system toward a pre-determined height condition of the vehicle;

b) determining an acceleration value of an acceleration acting on the vehicle;

c) comparing said acceleration value to a first pre-determined threshold value;

d) discontinuing said leveling action in response to said acceleration value exceeding said first pre-determined threshold value;

e) waiting until said acceleration value is one of less than and substantially equal to a second pre-determined threshold value that is less than said first pre-determined threshold value for a pre-determined duration; and, f) continuing said leveling action adjusting said suspension system toward a pre-determined height condition of the vehicle.

10. A method according to claim 9, wherein said first pre-determined threshold value is from about 0.2 g to about 0.4 g.

11. A method according to claim 9, wherein said air suspension system includes a controller and step a) includes said controller at least partially executing said leveling action.

12. A method according to claim 11, wherein step d) includes said controller acting to at least partially discontinue said leveling action.

13. A method according to claim 11, wherein step f) includes said controller acting to continue said leveling action once said acceleration value has been one of less than and substantially equal to said second pre-determined threshold value for a pre-determined duration.

14. A method according to claim 9, wherein said air suspension system includes an acceleration-determining device, and step b) includes said acceleration-determining device determining said acceleration value.

15. A method according to claim 14, wherein step e) includes said acceleration-determining device periodically determining an acceleration value corresponding to the acceleration and outputting a signal representative of said acceleration value.

16. A method according to claim 9, wherein said air suspension system includes a comparator, and step b) includes said comparator receiving a signal representative of said acceleration value and comparing said signal to said first pre-determined threshold.

17. A method according to claim 16, wherein step e) includes said comparator comparing a signal representative of said acceleration value to said second pre-determined value.

18. A method according to claim 9, wherein said air suspension system includes a timer and step e) includes said timer monitoring a duration that said acceleration value is one of less than and substantially equal to said second pre-determined threshold.

19. A method of leveling a vehicle having a height adjustable air suspension system that includes a controller, an acceleration-determining device, a comparator and a memory storing a first pre-determined threshold value and a second pre-determined threshold value that is less than said first pre-determined threshold value, said method comprising steps of:

a) determining an acceleration value of an acceleration acting on the vehicle using said acceleration-determining device:

b) comparing said acceleration value to said first pre-determined threshold value using said comparator;

c) initiating a leveling action using said controller to adjust said suspension system toward a pre-determined height condition of the vehicle in response to said acceleration value being one of less than and substantially equal to said first pre-determined threshold value;

d) repeating steps a) through c) until said acceleration value is greater than said first pre-determined threshold value;

e) discontinuing said leveling action prior to said suspension system achieving said pre-determined height condition in response to said acceleration value being greater than said first pre-determined threshold value;

f) waiting until said acceleration value is one of less than and substantially equal to said second pre-determined threshold value for a pre-determined period of time; and, g) continuing said discontinued leveling action adjusting said suspension system toward said pre-determined height condition.

20. A method according to claim 19, wherein said suspension system includes a timer and step f) includes determining that said acceleration value is one of less than and substantially equal to said second pre-determined threshold value for said pre-determined period of time using said timer.

21. A method according to claim 19 further comprising a step a repeating steps a) to g) after said suspension system has achieved said pre-determined height condition in step g).

* * * * *